J. J. ROBERSON.
AUTOMATIC SHEEP DIPPING APPARATUS.
APPLICATION FILED MAY 6, 1915.
1,173,866.
Patented Feb. 29, 1916.
2 SHEETS—SHEET 1.
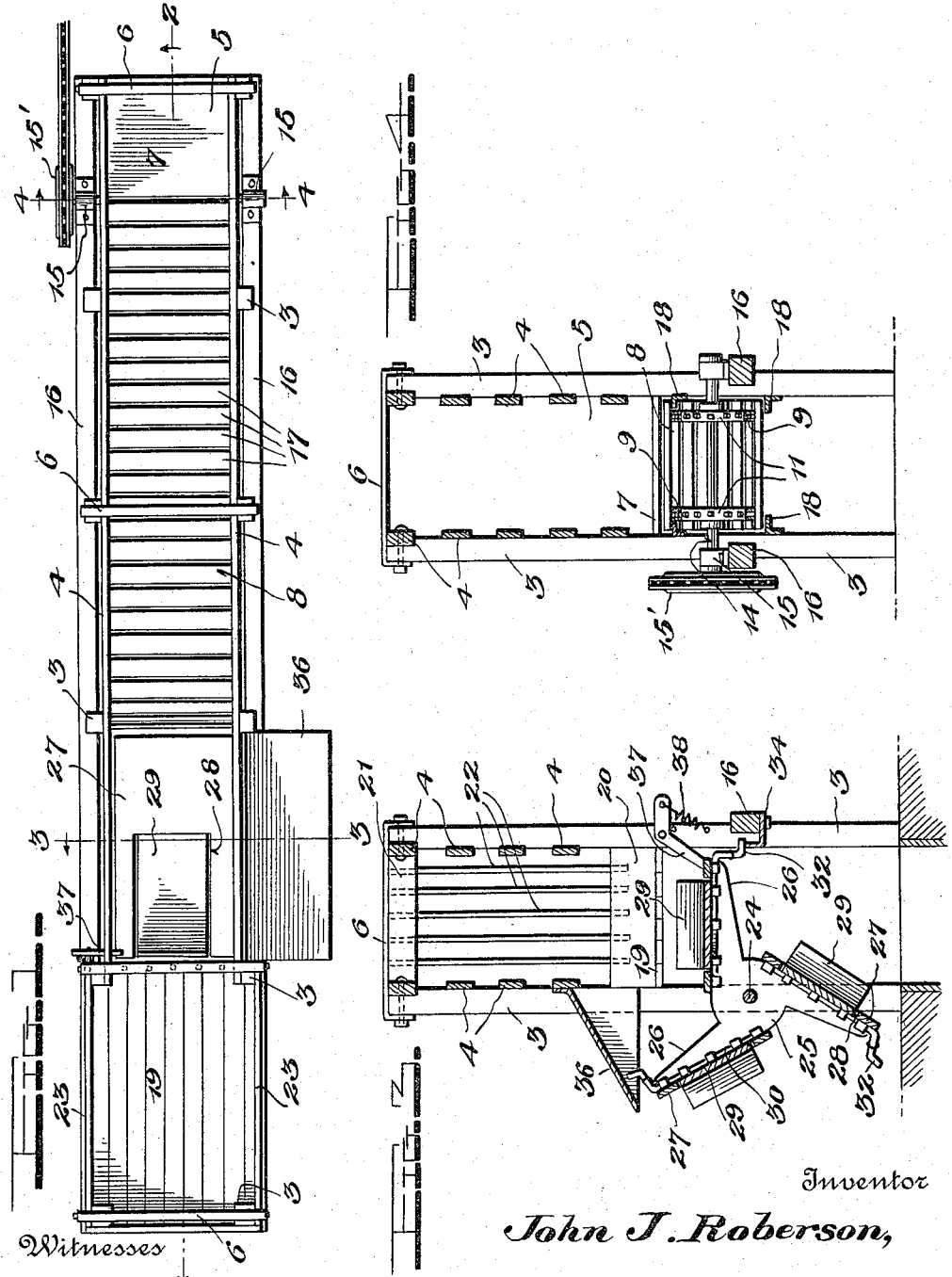
Witnesses
Inventor
John J. Roberson,
by A. B. Willson & Co.
Attorneys

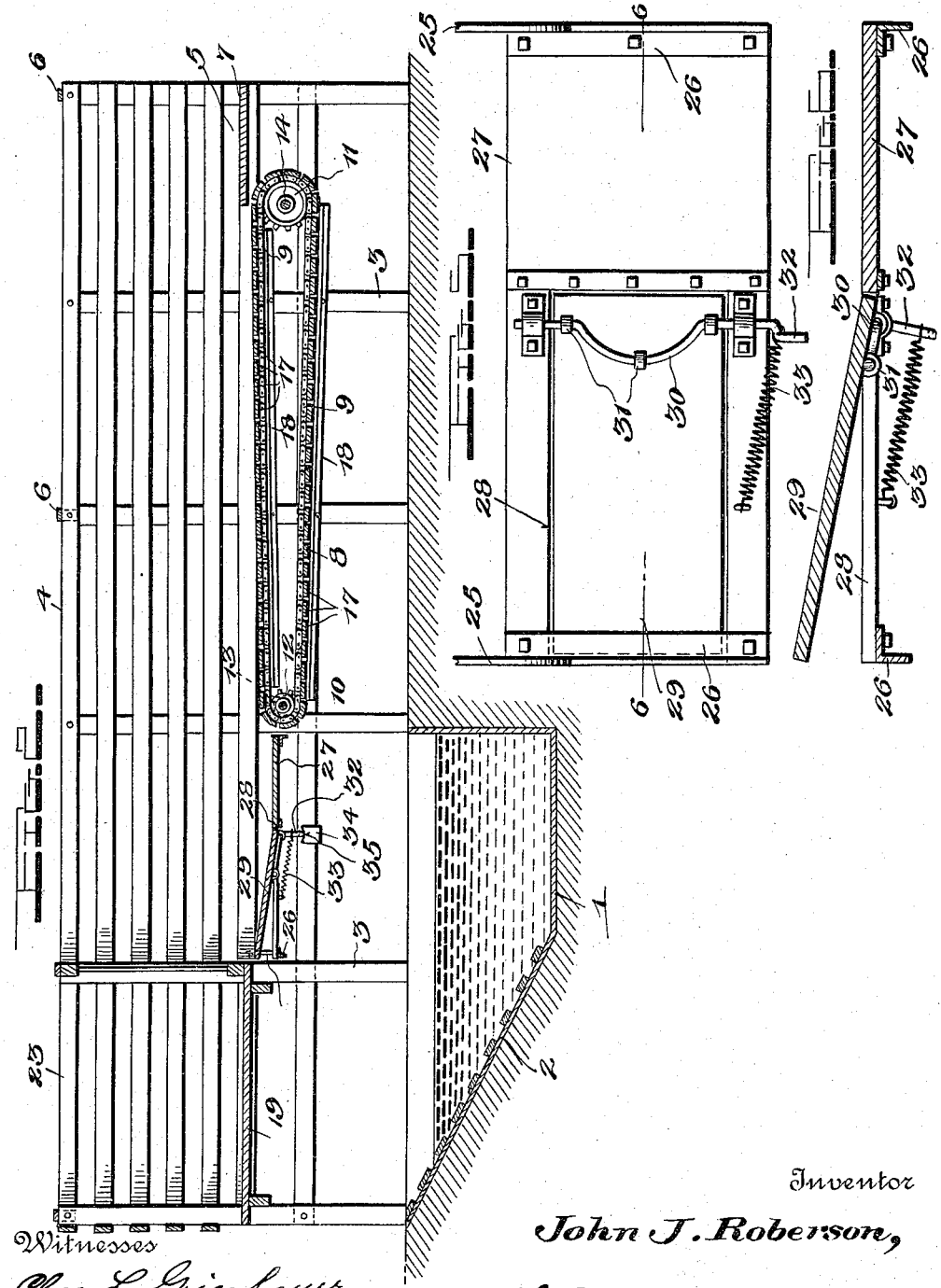

UNITED STATES PATENT OFFICE.

JOHN J. ROBERSON, OF SPRINGVILLE, UTAH.

AUTOMATIC SHEEP-DIPPING APPARATUS.

1,173,866.  Specification of Letters Patent.  Patented Feb. 29, 1916.

Application filed May 6, 1915. Serial No. 26,325.

*To all whom it may concern:*

Be it known that I, JOHN J. ROBERSON, a citizen of the United States, residing at Springville, in the county of Utah and State of Utah, have invented certain new and useful Improvements in Automatic Sheep-Dipping Apparatus; and I do declare the following to be a full, clear, and exact description of the invention, such as will enable others skilled in the art to which it appertains to make and use the same.

This invention while relating generally to a sheep dipping apparatus, appertains more specifically to a tripping mechanism used in connection therewith.

One object of the invention is to minimize the time and labor required in the process of dipping sheep by providing an apparatus having means to facilitate the dipping of large numbers of sheep or other animals in an expeditious manner.

Another and further object is to provide a tripping mechanism which will be automatically released when tranversed by the sheep to precipitate the latter in the treating liquid.

Another and still further object is to provide a tripping mechanism including a plurality of floors so arranged that when one of the latter has been actuated under weight of the sheep, another will be brought to operative position.

Another and further object resides in providing a simple and efficient tripping means through the instrumentality of which the various forces comprising the tripping mechanism may be quickly released from operative position.

With these and other objects in view, my invention consists of certain novel details of construction, combination and arrangement of parts which will be more particularly hereinafter described and claimed.

In the accompanying drawings wherein corresponding parts are indicated by similar reference characters: Figure 1 is a top plan view of my improved sheep dipping apparatus; Fig. 2 is a central longitudinal section thereof; Fig. 3 is a transverse vertical section taken on the line 3—3 of Fig. 1; Fig. 4 is a similar view taken on the line 4—4 of Fig. 1; Fig. 5 is a bottom plan view of one of the floors of the tripping mechanism; and Fig. 6 is a longitudinal section thereof taken on the line 6—6 of Fig. 5.

Broadly stated, my invention consists of a runway having in the length thereof an endless conveyer by means of which the sheep may be conveyed to a tripping mechanism, the latter being disposed above a receptacle containing a suitable treating liquid and adapted when traversed by the sheep to precipitate the same into the receptacle.

In its present embodiment my invention comprises a well 1 which is disposed beneath the ground surface and adapted to contain a suitable treating liquid or disinfectant. This well is provided with an upwardly and outwardly inclined cleated wall 2 extending to the ground surface to which the sheep after immersion may readily return. On opposite sides of the well 1 in alined relation are a series of vertically arranged suitably spaced standards 3 which extend from the upper end of the cleated wall 2 to a point spaced from the rear vertical wall of the well 1. Secured to the inner surfaces of standards 3 in vertically spaced relation are a plurality of side boards 4, the inner ends of which are secured to such of the standards 3 as are disposed approximately central of the well 1. This construction provides a runway 5 the purpose of which is obvious. To reinforce and brace the sides of the runway 5, certain of the standards 3 have their upper extremities connected to a bracing bar 6 which extends transversely across the runway.

Projecting inwardly from approximately the central portion of the outermost pair of standards 3 upon which it is suitably supported, is a flooring 7. Disposed longitudinally in the runway 5 is an endless conveyer 8 which extends from the inner end of flooring 7 to a point substantially above the inner end of well 1. This conveyer consists of the two endless sprocket chains 9 which pass over the inner and outer sprocket gears 10 and 11 respectively. Inner sprocket gears 10 are keyed upon a shaft 12, the extremities of which are journaled in suitable bearings 13 affixed to such of the standards 3 as are disposed contiguous the inner end of well 1 as clearly shown in Fig. 2 of the drawings. Outermost gears 11 are keyed to a shaft 14 having its extremities journaled in bearings 15 carried by the bearing supports 16. One extremity of shaft 14 is extended and has keyed thereto a driving pulley 15′ over which may pass a belt or other suitable operating member. In connection with the outermost pair of gears 11, it is here to be noted that the diameter of the latter slightly exceeds that of innermost gears 10 by reason whereof the upper stretch of the conveyer will have a gradual incline from the inner end of the flooring 7 to the tripping mechanism hereinafter to be set forth.

Tread boards 17 are disposed transversely across the sprocket chains 9 and have their extremities connected thereto. To prevent sagging of the upper stretch of the endless conveyer 8, a series of suitably arranged angle irons 18 are secured in such relation to the inner surface of standards 3 as to serve as runways for said conveyer, as will be readily understood without further description.

Situated intermediate the four innermost standards 3 at substantially the central portion thereof, is a flooring 19. Supported upon the inner end of flooring 19 between such of the standards 3 as are situated substantially central of the well 1 is a lower anchoring board 20. Also supported transversely between the same pair of standards 3 is an upper anchoring board 21. Vertically arranged between the upper and lower anchoring boards 20 and 21 respectively, are a plurality of properly spaced bars 22, the extremities of which are secured in suitable openings formed in the respective anchorages. Affixed to the exterior surface of the four innermost standards 3 are a series of suitably spaced cleats 23, as clearly shown in Fig. 1 of the drawings. By the construction just enumerated, there is formed a blind or pen into which one or more sheep may be placed to lure others upon the tripping mechanism hereinafter to be described.

In order that the sheep may be conveniently dropped into the treating liquid after leaving the endless conveyer, there is provided a tripping mechanism intermediate the inner end of endless conveyer 8 and that of flooring 19. This tripping mechanism comprises a longitudinally disposed shaft 24 suitably supported at its extremities between certain of the standards 3. Keyed to shaft 24 adjacent each extremity thereof, is an annular hub 25, the latter having a plurality of radially extending arms 26, whose upper edges are tangential to the periphery of hub 25. The tangential edges of arms 26 support the floors 27. Each of the floors 27 have formed therein a rectangular opening 28 within which is situated an auxiliary flooring 29, the area of which corresponds approximately with that of opening 28. Secured to the lower surface of each of the floors 29 adjacent the inner ends thereof is a crank shaft 30 loosely mounted in guides 31. The extremities of crank shaft 30 extend laterally from the auxiliary floor 29 and project into suitable bearings affixed to the lower surface of the floor 27 as clearly shown in Fig. 5 of the drawings. One extremity of crank shaft 30 has its end shaped to conform to the configuration of a bell crank as at 32 for a purpose hereinafter to be set forth. Also at one end of under surface of flooring 27 is a spring 33, the free end of which is connected to bell crank 32 so that the crank shaft 30 will be normally maintained in a position to elevate the outer end of auxiliary flooring 29 as shown in Fig. 2 of the drawings.

Owing to the angular disposition of floors 27, each of the latter may be revolved to a position wherein it will form a continuation of the conveyer 8. To maintain the floors 8 in a horizontal position so that they may be traversed by the sheep, a stop in the form of an angular plate 34 is affixed to one of the bearing supports 16, this plate having formed in the upper edge thereof a notch 35 adapted to receive the horizontal arm of bell crank 32. From the above it will be obvious that when the floors 27 are revolved to a horizontal position, bell crank 32 will engage the notch in plate 34 so as to fixedly retain said floors in adjusted position. However, as the weight of the sheep traversing the horizontally disposed floor, is placed upon the tilted auxiliary flooring 29, the latter will be moved downwardly and in so doing will revolve crank shaft 30 so as to disengage bell crank 32 from the notch in plate 34, thus releasing the flooring 27 and precipitating the sheep into the treating liquid. The shaft 24 will be thereby revolved until the bell crank 32 carried by the succeeding floor engages the notch in the plate 34, the floor passing under and being kept from rotating in the opposite direction by a latch 37, the latter being pivoted to one of the uprights 3 and provided with a spring 38 for actuating it.

To prevent the sheep from running off of flooring 27, a laterally projected hood 36 is suitably disposed upon the shaft 24 as clearly shown in Fig. 3 of the drawings.

In view of the above, it will be seen that the sheep may be run upon the flooring 7 and then conveyed by means of the endless conveyer 8 to one of the floors 27 and in traversing the same, will, through the instrumentality of the auxiliary flooring 29, actuate the tripping mechanism and thereby release the floor 27 and precipitate the sheep into the treating liquid: at the same time the succeeding floor will be properly disposed for the on-coming sheep.

Although from the foregoing I have set forth certain elements as best adapted to perform the functions allotted to them, nevertheless, it is to be understood that various minor changes as to form, substance etc. may be resorted to within the scope of the appended claim without departing from or sacrificing any of the principles of this invention.

Having now described my invention, what I claim is:

An automatic tripping mechanism arranged above a receptacle, comprising a shaft revolubly mounted upon a support, a pair of annular hubs secured to said shaft adjacent the extremities thereof, a plurality of arms extending radially from each of said hubs, angularly arranged floors carried by said arms and adapted to be successfully brought into horizontal position, a shaft rotatably mounted upon each of said angularly arranged floors, means coöperating with said shaft to engage the same and retain said floors in horizontal position, and a movable member disposed in the length of said floors and operatively connected with said shaft to actuate the latter and release said floors.

In testimony whereof I have hereunto set my hand in presence of two subscribing witnesses.

JOHN J. ROBERSON.

Witnesses:
 W. B. McPherson,
 M. R. Shaw.